United States Patent Office 3,255,129
Patented June 7, 1966

3,255,129
STABILIZATION OF POLYETHER-BASED POLYURETHANE ELASTOMER WITH ZINC DIBUTYL OR DIBENZYL DITHIOCARBAMATE
Richard J. Ferrari, Naugatuck, Conn., assignor to United States Rubber Company, New York, N.Y., a corporation of New Jersey
No Drawing. Filed Mar. 13, 1963, Ser. No. 264,754
4 Claims. (Cl. 260—2.5)

This invention relates to the stabilization of polyurethane elastomers, and more particularly it relates to the protection of polyurethane elastomers against deterioration upon exposure to adverse atmospheric influences such as light, flue gases, and heat, by incorporating in the elastomer a small amount of zinc dibutyl dithiocarbamate, zinc diamyl dithiocarbamate, or zinc dibenzyl dithiocarbamate.

Flexible polyurethane elastomer, such as polyurethane foam as conventionally prepared for such purposes as mattresses, cushioning, etc., has many good qualities but unfortunately it is not as stable as would be desirable.

In accordance with the invention it has surprisingly been found that flexible polyurethane foam or other forms of polyurethane elastomers can be stabilized against light discoloration or discoloration by flue gases (while providing good heat stability), by incorporating a small amount of zinc dibutyl dithiocarbamate, zinc diamyl dithiocarbamate, or zinc dibenzyl dithiocarbamate, in the polyurethane, conveniently by adding such dithiocarbamate to the elastomer-producing formulation. Zinc dibutyl dithiocarbamate and zinc dibenzyl dithiocarbamate are preferred.

The invention is distinct from anything suggested by U.S. Patent 3,006,870, Steinfatt et al., October 31, 1961, wherein zinc lower alkyl dithiocarbamates, specifically dimethyl and diethyl, are used to make polyurethane foams that are resistant to fungi and the like. The zinc dimethyl and diethyl dithiocarbamates result in a polyurethane which has poor stability to heat, unlike the presently employed dibutyl, diamyl, or dibenzyl chemicals. Conversely, the present chemicals have no utility as fungicides in polyurethane foam, unlike the zinc dimethyl and diethyl dithiocarbamates of Steinfatt et al.

In practicing the invention the zinc dibutyl, diamyl, or dibenzyl dithiocarbamate is added to the conventional polyurethane elastomer producing ingredients at any appropriate stage while the ingredients are still in a workable, uncured condition. Very small amounts are effective; as little as 0.1 part per 100 parts of polyurethane elastomer may be sufficient to produce appreciable improvement, but we usually prefer to use somewhat more, say 0.3–0.5 part, and more preferably about 1 to 2 parts. Larger amounts, such as 5–10 parts may be used but it is ordinarily not necessary to use more than 5 parts, and for reasons of economy it is not desirable to use excessively large amounts.

The polyurethane elastomer producing ingredients are otherwise as in conventional practice, that is, the elastomer is produced as usual from a polyether having at least two terminal hydroxy groups, and an organic polyisocyanate, usually diisocyanate. These ingredients when mixed together form a polyurethane reactive with conventional bifunctional curing or cross-linking agents, e.g., water, diamines, and the like, to form a flexible, elastic product. Water at the same time causes blowing (evolution of carbon dioxide gas), to form a foam. To make foam, other blowing agents such as volatile liquids may be used. The usual cell stabilizers, catalysts, or other desired ingredients may be included. The polymer used for reaction with polyisocyanate to make the polyurethane is frequently a polyol, such as a polyether polyol having a molecular weight of from 400 to 6000 and having a functionality (number of reactive hydroxyl groups) between 2 and 6 per molecule. There may be mentioned such polyethers, linear or branched, as polypropylene glycol, polypropylene-ethylene glycol and polytetrametheylene glycol. Similarly suitable are the polyether polyols of U.S. Patent 2,866,774, Price, December 30, 1958, e.g., propylene oxide-pentaerythritol condensation product, polypropylene oxide-trimethylol propane condensation product (poly oxypropylene triol), and the like. Among the suitable polyisocyanates may be mentioned m- and p-phenylene diisocyanate; toluene diisocyanate; p,p′-diphenylmethane-diisocyanate; p,p′-diphenyl-3,3′-dimethyl (or -dimethoxy) diisocyanate; 1,5-naphthylene diisocyanate; p,p′,p″-triphenylmethane triisocyanate; p,p′-phenylene diisothiocyanate; etc., as disclosed in more detail in the patents previously mentioned.

As in conventional practice, when making foam there may be included as a cell stabilizer a surface active agent taken from the classes described as silicones or organosilicones which may be block copolymers of polydimethylsiloxane and a glycol such as polyethylene glycol.

As a catalyst there is usually used a tertiary amine or combinations of tertiary amines. Levels of use for the amines are usually between 0.1 and 2.0 parts/100 parts polyol. In the specific instance of the foam process described as "one-shot polyether-based" tin salt compounds are generally used in addition to amine to provide desirable processing and foam characteristics. Examples of tin salt compounds which may be used are:

Stannous oleate
Stannous octoate

The level of use for these compounds is usually between 0.05 and 1.0 part per 100 polyol.

The blowing agent may be either water or a combination of water and trichloromonofluoromethane (TCMFM). The level of blowing agent regulates in great part the resulting foam density. Level of water is usually between 1.0 and 5.0 parts per 100 of polyol. Level of TCMFM is usually between 0 and 30 parts per 100 of polyol.

The number of equivalents of diisocyanate used usually approximates the number of equivalents of water added to the number of equivalents of polyol. This usually means between 20 and 70 parts of diisocyanate per 100 of polyol.

These materials may be foamed either by machine or by the "hand-batch" method. Usually either system involves adding the diisocyanate as one component. All or some of the other components may be premixed or added separately. All materials are normally at room temperature although variations in temperature may be used to regulate foaming rate to achieve certain characteristics. After addition, foaming is produced by mixing at high speed for short times and the mix is then poured into a suitable mold. The foam is then precured for fifteen minutes at 120° C., stripped, and conditioned at least three days prior to testing. In making solid products, e.g., coated fabrics or other surface coatings or castings, moldings, extruded thread, or the like it is more usual to make a "prepolymer" by first pre-reacting the diisocyanate and polyol. As is well understood by those skilled in the art, the ploymer is cured in the conventional manner by the action of such curing agents as diamines (e.g. aromatic amines such as p,p′-diaminodiphenyl methane, p-phenylene diamine, aliphatic amines such as hexamethylenediamine, tetramethylene diamine), aminophenols (p-aminophenol, m-amino-phenol), amino-alcohols (ethanolamine, p-aminobenzyl alcohol), diols or triols (e.g., 1-4-butanediol and trimethylolpropane) as well as water, and in some cases additional diisocyanate is used in the curing.

The following examples will serve to illustrate the practice of the invention in more detail.

EXAMPLE
*Polyether foam*

The following formulation may be used:

| | Parts by weight |
|---|---|
| Poly oxypropylene triol (4000 M.W.) | 100.0 |
| Water | 3.6 |
| TCMFM | 7.0 |
| Toluene diisocyanate | 43.0 |
| Stabilizer of the invention | 2.0 to 4.0 |

The formulation may further include a conventional cell stabilizer, e.g., polydimethylsiloxaneglycol (2.0 parts), and conventional catalysts, e.g., triethylenediamine (0.2 part), stannous octoate (0.5 part). The diisocyanate may be added to the triol and the other ingredients added and mixed vigorously, poured into a mold, precured for 15 minutes at 120° C., stripped, and let stand three days prior to testing.

Foams containing the stabilizers of the invention were tested for light stability by an indirect light test run as follows: foam slices 6" x 4" x ½" were exposed on a shelf at ambient conditions. The light used to affect foam color was diffuse, indirect sunlight and direct fluorescent lighting. In one test, two foams, one with and one without 3 parts of zinc dibutyl dithiocarbamate were observed after 6 weeks of conditioning in indirect light. The one with the zinc dibutyl dithiocarbamate shows remarkable light stability, that is, it shows very little tendency to discolor, being off white to very light cream, and the color penetration is only skin deep (about 1 mm.). In contrast, the sample without the zinc dibutyl dithiocarbamate is extensively discolored, being a deep yellow tan to brown color which has penetrated deeply to a depth of ¼ to ½ inch (6 or more mm.).

Another important aging test involves subjecting a 6" x 6" x 6" block of foam to a temperature of 290° F. in an oven for 22 hours. Foam samples containing zinc dibutyl, diamyl, or dibenzyl dithiocarbamate in accordance with the invention remained strong and resilient. On the other hand if the zinc dimethyl or diethyl dithiocarbamate of Steinfatt 3,006,870 was substituted for the stabilizer of the invention the foam became crumbly and weak. It is therefore a remarkable and unexpected advantage of the stabilizers of the invention that they confer light stability while maintaining good heat stability, unlike the chemicals of Steinfatt which have an extremely adverse effect on heat stability.

Having thus described my invention, what I claim and desire to protect by Letters Patent is:

1. Polyurethane elastomer which is a reaction product of an organic polyisocyanate and a polyether having a molecular weight of from 400 to 6000 and containing from 2 to 6 hydroxyl groups per molecule, said polyurethane containing, as a stabilizer, from 0.1 to 5 parts, per 100 parts of said reaction product, of a chemical selected from the group consisting of zinc dibutyl dithiocarbamate and zinc dibenzyl dithiocarbamate.

2. Flexible, elastic polyurethane foam which is a foamed reaction product of an organic polyisocyanate and a polyether having a molecular weight of from 400 to 6000 and containing from 2 to 6 hydroxyl groups per molecule, said foam containing, as a stabilizer, from 0.1 to 10 parts, per 100 parts by weight of said reaction product, of a chemical selected from the group consisting of zinc dibutyl dithiocarbamate and zinc dibenzyl dithiocarbamate.

3. Foam as in claim 2, in which the said chemical is zinc dibutyl dithiocarbamate.

4. Foam as in claim 2, in which the said chemical is zinc dibenzyl dithiocarbamate.

References Cited by the Examiner
UNITED STATES PATENTS

| | | | |
|---|---|---|---|
| 3,006,870 | 10/1961 | Steinfatt et al. | 260—2.5 |
| 3,182,037 | 5/1965 | Nelson | 260—45.75 |

LEON J. BERCOVITZ, *Primary Examiner.*

DONALD E. CZAJA, *Assistant Examiner.*